Sept. 12, 1967

T. W. MYERS 3,341,031

OVERCAP STACKING APPARATUS

Filed Sept. 21, 1964

INVENTOR
TRAVIS W. MYERS

BY Mason, Porter, Diller & Stewart

ATTORNEYS

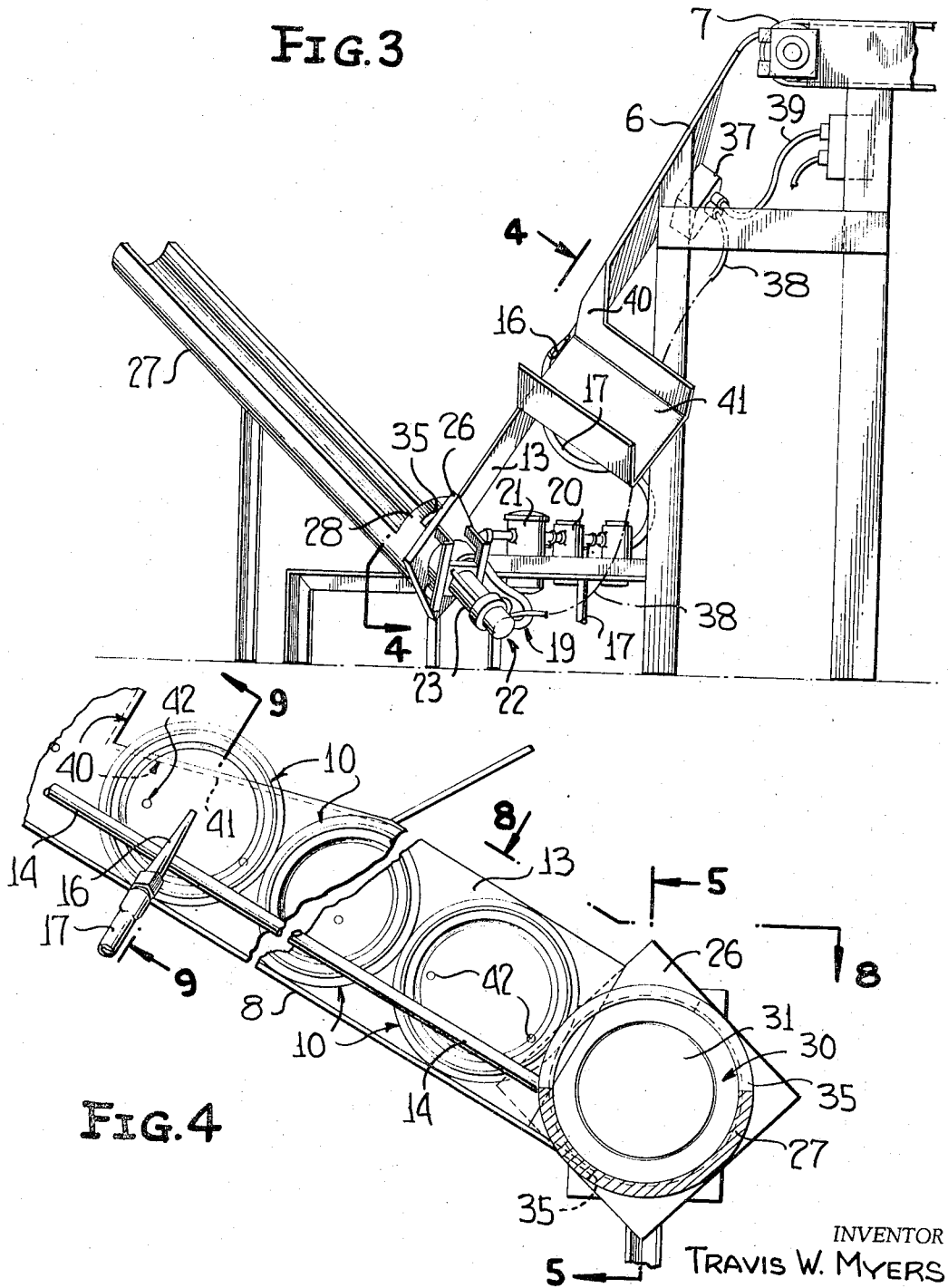

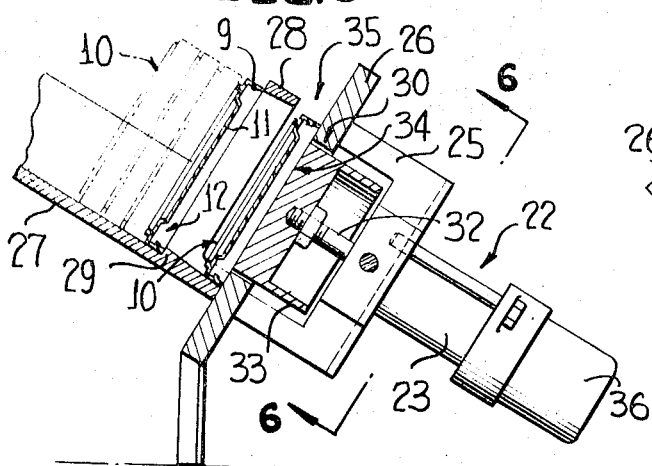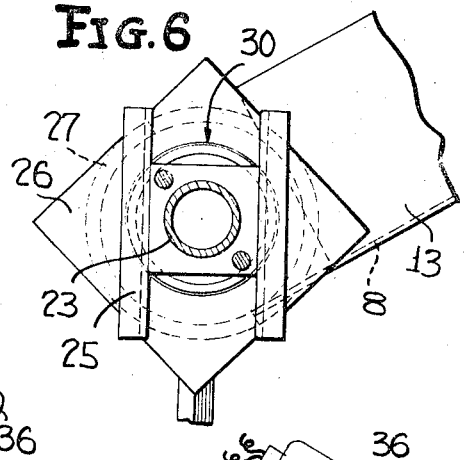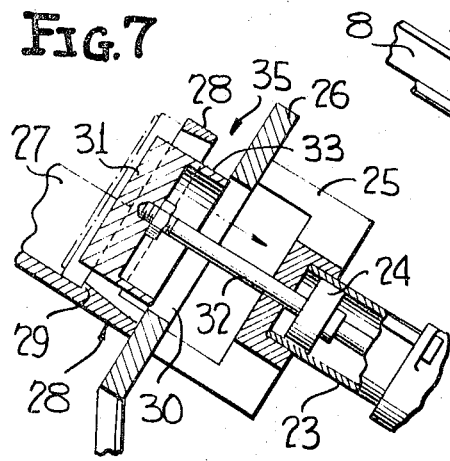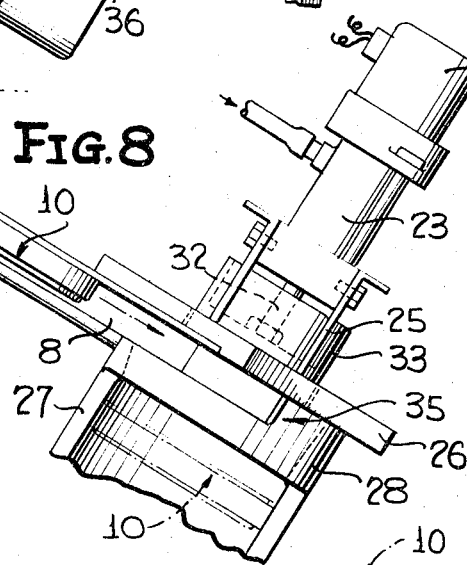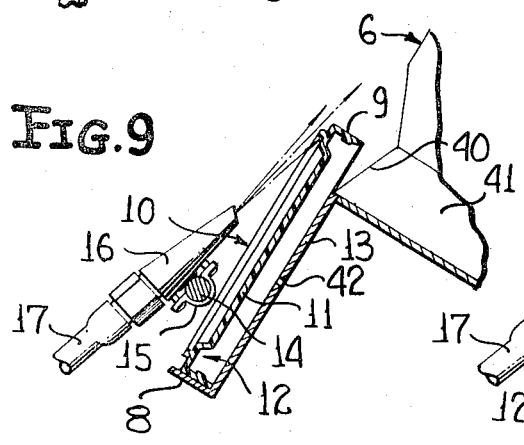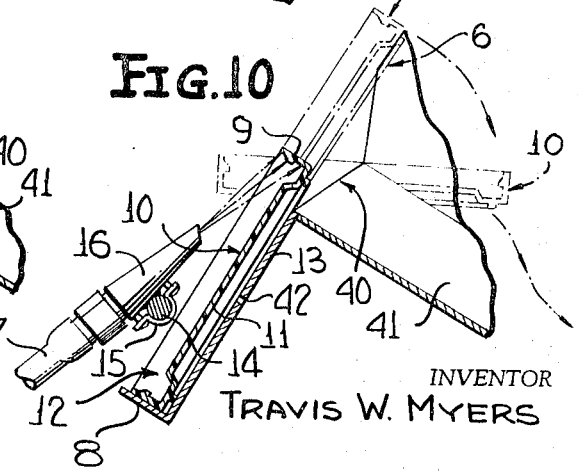

United States Patent Office 3,341,031
Patented Sept. 12, 1967

3,341,031
OVERCAP STACKING APPARATUS
Travis W. Myers, Houston, Tex., assignor to Continental Can Company, Inc., New York, N.Y., a corporation of New York
Filed Sept. 21, 1964, Ser. No. 397,995
19 Claims. (Cl. 214—6)

The invention relates generally to apparatus for stacking cap-like articles, and more particularly seeks to provide certain new and useful improvements in apparatus intended for the stacking of overcaps designed for use on coffee cans or the like.

While adapted for the receiving and stacking of other articles of comparable shapes including top or crown portions and depending skirts defining therewithin a hollow portion, the invention is designed particularly for the handling of the beforementioned overcaps which are molded of deformable, resilient plastic, such as polyethylene or the like, and intended to be snapped over the tops of containers such as coffee cans to serve as reclosure devices after the containers have been opened. These overcaps are quite popular and are extensively used at the present time, and there has been a need for an efficiently operable apparatus for receiving these light weight bouncy articles and stacking them for storage and/or direct application on cans.

An object of the invention is to provide an apparatus of the character stated including a chute on which the overcaps are received from a delivery source and which delivers them one after another to the receiving end of a stacker column, reciprocating plunger means being included and effective to engage each overcap and place it in stack relation in the stacker column.

Another object of the invention is to provide an apparatus of the character stated wherein provision is made for ejecting from the chute all overcaps not in proper position to be received in the stacking column.

Another object of the invention is to provide an apparatus of the character stated wherein the chute includes a wall portion engaged by overcaps on their way to the stacking column and which is provided with apertures over which overcaps will engage and which are effective to assure that a vacuum is not created in the hollow portion of any overcap due to cooling of air therein and which would tend to cause an overcap moving toward said column to cling to a chute wall portion and interfere with free movement of overcaps toward an entrance into said column.

A further object of the invention is to provide an apparatus of the character stated wherein the stacking column projects uprightly from the chute and includes stack retaining shoulder means therein, and the reciprocating plunger means engageable with serially presented overcaps lifts each overcap engaged thereby into position above said shoulder means to be retained thereby together with the superposed stack of overcaps.

A further object of the invention is to provide an apparatus of the character stated wherein the stack retaining shoulder in the stacking column comprises a generally continuous ring disposed above the entrance into the column and through and over which deformable skirts of the overcaps snap into stack supporting position on said shoulder.

A still further object of the invention is to provide an apparatus of the character stated wherein the chute includes a downwardly inclined floor along which the overcaps roll toward the stacking column and a laterally and upwardly inclined wall directed into an entrance to the stacking column, the latter projecting uprightly from the plane of said wall, the reciprocating plunger providing a floor in said column when in its retracted position, the column including a stack retaining shoulder and said plunger serving when projected to lift each overcap received thereon in its retracted position into a position above said shoulder to be retained thereby together with the superposed stack of overcaps within the column.

Yet another object of the invention is to provide an apparatus of the character stated wherein the overcap lifting plunger includes a depending skirt effective to close the entrance into the column each time the plunger is projected to lift an overcap into the column.

Yet another object of the invention is to provide an apparatus of the character stated wherein the inclined chute wall is equipped with an overcap rejection clearance effective to permit fall-away and rejection of any overcap moving along in nested relation on, or rolling along over, a row of overcaps progressing toward the entrance into the stacking column along the downwardly inclined chute floor.

Still another object of the invention is to provide an apparatus of the character stated wherein the overcap rejection clearance in the chute wall is placed at such a height above the chute floor that upper portions of overcaps rolling along over said floor projects above said clearance, and there being included an air jet nozzle disposed opposite said clearance and in such position that the air jet directed therefrom when entering the hollow portion of an overcap rolling along the floor will bring about an ejection of that overcap whereas overcaps rolling along the floor with their crown portions disposed for engagement by said air jet will be so engaged but with consequent glancing off of the air without ejection of such crown portion presented overcaps through the wall clearance.

With the above and other objects in view that will hereinafter appear, the nature of the invention will be more clearly understood by reference to the following detailed description, the appended claims and the several views illustrated in the accompanying drawings.

In the drawings:

FIGURE 3 is a side elevation looking at the apparatus of FIGURE 2 as on the line 3—3 on FIGURE 2.

FIGURE 4 is a fragmentary sectional view taken on the line 4—4 on FIGURE 3.

FIGURE 5 is a fragmentary sectional view taken on the line 5—5 on FIGURE 4, the stacking plunger being shown in its retracted position.

FIGURE 6 is a fragmentary sectional view taken on the line 6—6 on FIGURE 5.

FIGURE 7 is a fragmentary sectional view similar to FIGURE 5, the stacking plunger being shown in its projected position for placing an overcap in the stack.

FIGURE 8 is a fragmentary plan view looking down on the fragment of the stacking means at the line 8—8 on FIGURE 4.

FIGURES 9 and 10 are enlarged cross sectional views taken on the line 9—9 on FIGURE 4, FIGURE 9 illustrating the action as an overcap is passing the ejector jet in a crown-up position, and FIGURE 10 illustrating an overcap passing the ejector jet in a hollow-up position, the overcap being shown in the process of ejection in dot and dash lines.

In the example of embodiment of the invention herein disclosed, the stacking apparatus or stacking station is generally designated 5. The improved apparatus includes a chute 6 onto which the overcaps may be delivered mechanically in any approved manner, as by the belt conveyor 7 driven by any approved means (not shown).

The delivery means 7 may deliver overcaps received from the molding machine in which they are molded, or from some other source.

Figure 1:
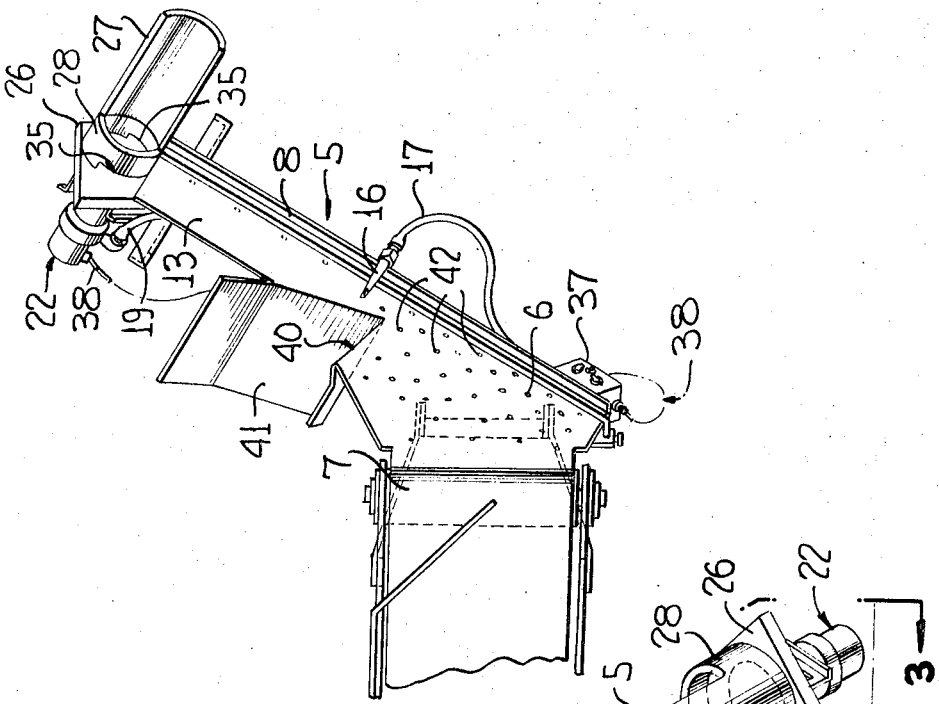
FIGURE 1 is a plan view illustrating the invention.
Figure 2:
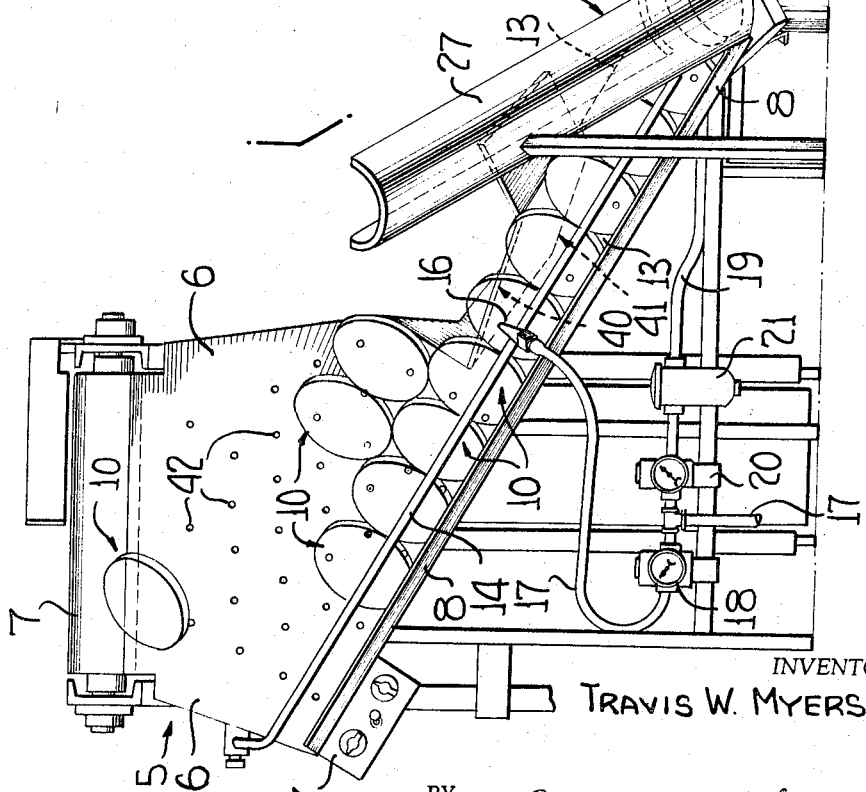
FIGURE 2 is an end elevation illustrating the delivery of overcaps onto the chute of the improved stacking apparatus.

It will be apparent by reference to FIGURES 1, 2 and 3 of the drawings that the chute 6 receives the overcaps flatwise and directs them onto a narrow downwardly inclined floor 8 which is only slightly wider than the depth of the overcap skirts 9. See FIGURES 2, 4, 9 and 10. It will be apparent from these illustrations that each of the overcaps generally designated 10 includes the skirt 9 and a top or crown portion 11 defining with said skirt a hollow interior portion 12.

The chute floor 8 is provided along the full width of the chute 6 and also extends full length of the wall portion 13 projecting downwardly at an incline from one side of the chute 6 as clearly shown in FIGURES 1 and 2. It will be apparent that the wall extension 13 approximates in width the diameters of the overcaps 10. A retainer rod 14 parallels the chute 6 and its extension 13 and retains overcaps which might bounce about and also forms a support at 15 for the ejector jet nozzle 16. See FIGURES 1, 2, 9 and 10.

A jet of air is continuously delivered through the nozzle 16 from the source line 17 through a suitable control 18, and air from the said source is supplied through the line 19, the control 20 and the strainer 21 to an electrically controlled, air actuated plunger reciprocating unit generally designated 22. Any approved form of such unit may be employed, preferably a well known Bellows unit which is readily and commercially available, for example, at The Bellows Co., 228 W. Market, Akron 9, Ohio. See FIGURES 1 to 3 and 5 to 8.

It will be apparent by reference to FIGURES 2, 4, 9 and 10 that the air jet delivered from the nozzle 16 is directed against each overcap rolling down the supporting floor 8. The arrangement is such that when overcaps are moving along the supporting floor or ledge 8 with their tops or crown portions 11 toward the jet, the air jet will pass over them without displacing them, as indicated in FIGURE 9, whereas when such overcaps are moving along with their hollow portions 12 directed outwardly to receive the air jet therein, as indicated in FIGURE 10, such overcaps will be ejected from the line, as hereinafter described. Attention is directed to the fact that the floor 8 is inclined downwardly and that the chute 6 and its extension 13 rising in generally perpendicular relation to the floor 8 are inclined upwardly and laterally as will be clearly apparent by reference to FIGURES 1, 9 and 10.

The air actuated plunger reciprocating unit generally designated 22 includes the usual cylinder 23 having therein a reciprocable piston 24 and the unit is supported at 25 on a mounting base 26 from which an open sided stacker column 27 projects. The stacker column includes a bottom ring 28 presenting a retaining shoulder 29, and the base 26 is apertured at 30 to receive the stacking plunger 31 which is attached at 32 to the cylinder piston 24 and includes the depending skirt 33. The stacking plunger, when in retracted position, presents a floor 34 in the stacker column on which to receive overcaps 10 as they roll through the clearance or inlet slot 35 in the stacker ring 28, as shown in FIGURE 5.

The stacking plunger unit also includes the usual impulse solenoid 36 which actuates the usual air control valve in proper timed sequence under control of the usual commercially available timer 37 which is connected with the unit as at 38 and with the power source at 39.

Directly opposite the air jet nozzles 16 the runway wall or chute projection 13 is interrupted at 40 to provide a reject outlet leading into a reject chute or collection receiver 41. It is to be understood that overcaps passing through the chute 41 can be received in a collecting device for return to the conveyor 7 and chute 6, or for other disposal.

It is to be noted from FIGURES 1, 2, 4, 9 and 10 that the chute 6 and its extension 13 are equipped with apertures 42, the same being placed strategically so that each overcap in moving toward and along the floor 8 always will engage over at least one said aperture. The provision of these apertures assures that a vacuum will not be created in the hollow portion of any overcap due to cooling of air therein and which would tend to cause an overcap moving toward the stacking column to cling to a chute wall portion and interfere with free movement of overcaps toward the entrance into the stacking column. This equipment is highly desirable in installations wherein the overcaps are being delivered to the stacking apparatus promptly after molding thereof, thus being still warm at the time the stacking procedure is in progress, or is being initiated.

In operation, following deposition of the overcaps onto the chute 6, said overcaps roll down the ledge or floor 8 in close processional order behind the guide 14, as indicated in FIGURE 2, and pass individually through the stacker column ring slot or entrance 35 into the stacking position illustrated in FIGURE 5, and as the overcaps successively come into this position, the electrically controlled air actuated unit operates to reciprocate the plunger 31 and move the overcaps one-by-one up into the stacker column 27, each overcap skirt 9 snapping behind the shoulder 29 and retaining the superposed stack in position, as illustrated in FIGURE 5.

Should there be any malfunctioning of parts due to bouncing about of the overcaps, or otherwise occasioned displacement of overcaps so that one or more thereof may be moving along the floor or ledge 8 with their skirts 9 or hollow portions 12 directed outwardly as indicated in FIGURE 10, the air jet delivered through the nozzle 16 would engage within such overcap skirts and eject them out over the interruption 40 in the wall 13 and deliver them into the reject chute 41, as indicated in dot and dash lines in FIGURE 10.

It is also conceivable that some overcaps may bounce or roll into nested row relation over certain overcaps engaged with the floor 8 as indicated in FIGURE 2. It will be apparent that because of the upward and lateral tilting of the chute 6 and its extension wall portion 13 as indicated in FIGURES 1, 9 and 10, such nested or overlying caps will immediately fall by gravity action through the wall interruption 40 and onto the reject chute 41. It will also be apparent that the air jetting action at 16 will accelerate this disposal of improperly placed overcaps so that they cannot interfere with the desired orderly and processional presentation of the overcaps into the stacking column through its receiving opening or clearance 35.

Each upward movement of the stacking plunger 31 will move or lift the last incoming overcap 10 from its position illustrated in FIGURE 5 through the stack ring 28 into the stacking column to be supported on the shoulder 29 with the previously stacked overcaps in supported contact thereover, the plunger skirt 33 at this time serving to close off the inlet slot 35 or entrance into the stacker column and prevent inrolling of the next oncoming article 10.

While preferred part structures and arrangements are disclosed herein, it is to be understood that variations in such structures and part arrangements may be made without departing from the spirit and scope of the invention as outlined in the appended claims.

I claim:

1. In apparatus for receiving and stacking cap-like articles having top portions and peripheral skirts defining therewithin a hollow, a stacker column, a chute on which to receive the articles from a delivery source and deliver them one after another to a receiving end of the column, reciprocating plunger means operable to engage each article presented at said receiving end of the column and place it in stacked relationship in the stacker column, said chute including a downwardly inclined floor along which the articles roll toward a lower entrance end portion of the stacker column from which the column projects upwardly and a laterally and upwardly inclined wall directed into said entrance end, the reciprocal plunger being disposed to provide a floor in said column when the plunger is retracted, the column including a stack retaining shoulder, said plunger serving when projected to lift each article received thereon in its retracted position into a position above said shoulder to be retained thereby together with the superposed stack of articles within the column, the laterally and upwardly inclined chute wall is equipped with an article rejection clearance placed at such a height above the chute floor that upper portions of articles rolling along over said floor project above said clearance, and there is included an air jet nozzle disposed opposite said clearance and in such position that the air jet directed therefrom when entering the hollow portion of an article rolling along the floor will bring about an ejection of that article whereas articles rolling along the floor with their top portions disposed for engagement by said air jet will be so engaged but with consequent glancing off of the air without ejection of such top portion presented articles, said chute also including wall portions engaged by the articles on their way to the stacker column and which are provided with apertures over which said articles will engage and which are effective to assure that a vacuum is not created in the hollow portion of any said article due to cooling of air therein and which would tend to cause such an article moving toward said column to cling to a chute wall portion and interfere with free movement of articles toward the stacker column receiving end.

2. Apparatus for receiving and stacking cap-like articles having top portions and peripheral skirts defining therewithin a hollow comprising a downwardly inclined chute having a carrying surface on which articles are received with their hollow sides normally facing the chute carrying surface, means for delivering the articles to the chute, said chute having opposite longitudinal edge portions, longitudinal guide means along one of said edge portions, means defining a discharge station along the other of said edge portions, and pneumatic means located above the chute for directing air transversely of said chute from said one edge portion toward said other edge portion at an acute angle to said chute thereby directing an air jet into the hollow of and against a skirt portion of an improperly positioned article moving along the chute with its hollow directed upwardly causing the discharge thereof at the discharge station.

3. Apparatus as defined in claim 2 wherein said stacking means including a stacker column projecting uprightly from the chute, said column has an article receiving end which includes a stack retaining shoulder means above its receiving end, said stacking means also including reciprocating plunger means operable to engage each article presented at said receiving end of the column and place it in stacked relationship in the stacker column, and wherein the plunger means engages articles serially presented at said receiving end and lifts each article engaged thereby into position above said shoulder means to be retained thereby together with the superposed stack of articles, the deformable skirt of each article so lifted being deflected inwardly in passing over the shoulder means and then snapping outwardly above the shoulder means.

4. Apparatus as defined in claim 2 wherein said ejecting means includes a clearance in a wall portion of the chute through which said improperly positioned articles may fall by gravity action.

5. Apparatus as defined in claim 2 wherein said ejecting means includes means for directing an air jet into the hollow of and against a skirt portion of an article moving along with its hollow directed toward the jet, thereby to blow such an improperly positioned article off the chute.

6. Apparatus as defined in claim 2 wherein said ejecting means includes an air jet directing nozzle disposed to direct an air jet into the hollow of and against a skirt portion of an article moving along with its hollow directed toward the jet, thereby to blow such an improperly positioned article off the chute, and also a clearance in a wall portion of the chute through which otherwise improperly positioned articles may fall by gravity action.

7. Apparatus as defined in claim 2 wherein said stacking means includes a stacker column and reciprocating plunger means operable to engage each article presented at a receiving end of said column and place it in stacked relationship in the stacker column, the chute includes a downwardly inclined floor along which the articles roll toward a lower entrance end portion of the stacker column from which the column projects upwardly and a laterally and upwardly inclined wall directed into said entrance end, the reciprocating plunger being disposed to provide a floor in said column when the plunger is retracted, the column including a stack retaining shoulder and said plunger serving when projected to lift each article received thereon in its retracted position into a position above said shoulder to be retained thereby together with the superposed stack of articles within the column.

8. Apparatus as defined in claim 7 wherein the plunger also includes a depending skirt effective to close the entrance into the column each time the plunger is projected to lift an article into the column thereby to prevent movement of another article into the column entrance until the plunger is again retracted.

9. Apparatus as defined in claim 7 wherein there also are included means for ejecting from the chute all articles not in proper position to be received in the stacker column.

10. Apparatus as defined in claim 7 wherein there also are included means for ejecting from the chute all articles not in proper position to be received in the stacker column, said last named means including a clearance in a wall portion of the chute through which said improperly positioned articles may fall by gravity action.

11. Apparatus as defined in claim 7 wherein there also are included means for ejecting from the chute all articles not in proper position to be received in the stacker column, said last named means including an air jet directing nozzle disposed to direct an air jet into the hollow of and against a skirt portion of an article moving along with its hollow directed toward the jet, thereby to blow such an improperly positioned article off the chute.

12. Apparatus as defined in claim 7 wherein there also are included means for ejecting from the chute all articles not in proper position to be received in the stacker column, and also a clearance in a wall portion of the chute through which otherwise improperly positioned articles may fall by gravity action.

13. Apparatus as defined in claim 7 wherein the laterally and upwardly inclined chute wall is equipped with an article rejection clearance placed to be effective to permit fall-away rejection of any article moving along in nested row relation on or rolling along over a row of articles progressing toward the entrance into the stacker column along the downwardly inclined chute floor.

14. Apparatus as defined in claim 7 wherein the laterally and upwardly inclined chute wall is equipped with an article rejection clearance placed at such a height above the chute floor that upper portions of articles rolling along over said floor project above said clearance, and there is included an air jet nozzle disposed opposite said clearance and in such position that the air jet directed therefrom when entering the hollow portion of an article rolling along the floor will bring about an ejection of that article whereas articles rolling along the floor with their top portions disposed for engagement by said air jet will be so engaged but with consequent glancing off of the air without ejection of such top portion presented articles.

15. Apparatus as defined in claim 7 wherein the laterally and upwardly inclined chute wall is equipped with an article rejection clearance placed to be effective to permit fall-away rejection of any article moving along in nested row relation on or rolling along over a row of articles progressing toward the entrance into the stacker column along the downwardly inclined chute floor, said chute also including wall portions engaged by the articles on their way to the stacker column and which are provided with apertures over which said articles will engage and which are effective to assure that a vacuum is not created in the hollow portion of any said article due to cooling of air therein and which would tend to cause such an article moving toward said column to cling to a chute wall portion and interfere with free movement of articles toward the stacker column receiving end.

16. Apparatus as defined in claim 2 wherein said chute is also laterally tilted, and said other edge portion is disposed above said one edge portion.

17. Apparatus as defined in claim 2 wherein said chute has aperture means for exposing the hollow of articles to atmosphere to assure that a vacuum is not created in the hollow portion of any article due to cooling of air therein which would tend to cause such an article to cling to the chute and interfere with the free movement of the article therealong.

18. Apparatus as defined in claim 2 wherein said chute is downwardly inclined and laterally tilted whereby articles delivered thereby are similarly delivered in a downwardly inclined and laterally tilted fashion.

19. Apparatus as defined in claim 18 wherein said chute is provided with apertures which are effective to assure that a vacuum is not created in the hollow portion of any article due to cooling of air therein which would tend to cause such an article to cling to the chute and interfere with free movement of the articles toward said stacking means.

References Cited

UNITED STATES PATENTS

| | | | |
|---|---|---|---|
| 2,104,657 | 1/1938 | Bombard | 214—7 |
| 2,385,951 | 10/1945 | Stelzer | 193—43 |
| 2,725,992 | 12/1955 | Wells | 214—7 |
| 3,012,651 | 12/1961 | Hawkes | 198—33 |
| 3,075,625 | 1/1963 | Randall | 214—1 |
| 3,135,509 | 6/1964 | Zweig | 271—86 |
| 3,195,705 | 7/1965 | Ochs et al. | 193—43 |
| 3,300,065 | 1/1967 | Witmer | 214—1 |

GERALD M. FORLENZA, *Primary Examiner.*

J. E. OLDS, *Assistant Examiner.*